US009483661B2

(12) United States Patent
Picazo

(10) Patent No.: US 9,483,661 B2
(45) Date of Patent: Nov. 1, 2016

(54) FACILITATING ELECTRONIC SIGNATURES BASED ON PHYSICAL PROXIMITY OF DEVICES

(75) Inventor: Paul Picazo, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 364 days.

(21) Appl. No.: 13/592,050

(22) Filed: Aug. 22, 2012

(65) Prior Publication Data

US 2014/0059353 A1 Feb. 27, 2014

(51) Int. Cl.
*G06F 21/64* (2013.01)
*H04W 12/10* (2009.01)
*H04W 76/02* (2009.01)
*H04L 29/06* (2006.01)
*H04W 4/00* (2009.01)
*H04W 8/00* (2009.01)

(52) U.S. Cl.
CPC ............ *G06F 21/645* (2013.01); *H04W 12/10* (2013.01); *H04W 76/023* (2013.01); *G06F 2221/2111* (2013.01); *H04L 63/123* (2013.01); *H04W 4/008* (2013.01); *H04W 8/005* (2013.01)

(58) Field of Classification Search
CPC . H04L 9/3231; H04L 9/3247; H04L 9/3281; G06F 21/645; G06F 2221/2111
USPC ......................................... 713/168, 176, 189
See application file for complete search history.

(56) References Cited

U.S. PATENT DOCUMENTS

| 5,432,326 A * | 7/1995 | Noblett, Jr. | ............ G06Q 20/00 235/380 |
| 6,307,955 B1 * | 10/2001 | Zank | ................... G06K 9/00154 380/30 |
| 2002/0069179 A1 * | 6/2002 | Slater | ..................... G06Q 20/00 705/67 |
| 2010/0253507 A1 * | 10/2010 | Jung | ................... H04M 1/7253 340/539.13 |
| 2011/0093777 A1 * | 4/2011 | Dunn | .................... G06F 17/243 715/268 |
| 2011/0185184 A1 * | 7/2011 | Guenther | ................ G06F 21/32 713/182 |
| 2011/0276875 A1 * | 11/2011 | McCabe | ................ G06Q 10/10 715/255 |
| 2011/0293094 A1 * | 12/2011 | Os | ......................... H04L 9/0838 380/255 |
| 2011/0314371 A1 * | 12/2011 | Peterson | ............... G06F 21/645 715/234 |
| 2012/0160912 A1 * | 6/2012 | Laracey | ............ G06Q 20/1085 235/379 |
| 2012/0190301 A1 * | 7/2012 | Hart | ..................... H04M 1/7253 455/41.2 |
| 2013/0019289 A1 * | 1/2013 | Gonser | ................... G06F 21/64 726/6 |
| 2013/0074170 A1 * | 3/2013 | Lo | ........................... G06F 21/43 726/7 |

OTHER PUBLICATIONS

Giuseppe Ateniese, Verifiable Encryption of Digital Signatures and Applications, Feb. 2004, ACM, vol. 7 Issue 1, pp. 1-20.*
Evgenia Pisko, Mobile Electronic Signatures: Progression from Mobile Service to Mobile Application Unit, Jul. 9-11, 2007, IEEE, pp. 1-6.*
Thomas Kwok et al., An Automatic Electronic Contract Document Signing System in a Secure Environment, Jul. 19-22, 2005, IEEE, pp. 497-502.*
Michael Roland et al., Digital Signature Records for the NFC Data Exchange Format, Apr. 20-20, 2010, IEEE, pp. 71-76.*

* cited by examiner

*Primary Examiner* — Kari Schmidt
*Assistant Examiner* — Fahimeh Mohammadi
(74) *Attorney, Agent, or Firm* — Shook, Hardy & Bacon L.L.P.

(57) ABSTRACT

Systems and methods for requesting transmission of a document from a sender device to a signer device, for purposes of obtaining an e-signature from the signer device, are disclosed. In some example embodiments, the systems and methods establish and/or determine a physical proximity between a signer device and a sender device, such as via a handshake between the devices, and a document to be signed is provided to the signer device in response to the established physical proximity.

19 Claims, 5 Drawing Sheets

FACILITATING ELECTRONIC SIGNATURES BASED ON PHYSICAL PROXIMITY OF DEVICES

TECHNICAL FIELD

The present disclosure generally relates to electronic signature services. More specifically, the present disclosure relates to methods, systems and computer program products for facilitating electronic signatures based on physical proximity of devices.

BACKGROUND

Obtaining a person's hand-written signature on a document can be a time consuming task. Fortunately, electronic signatures have become widely accepted. Although there are many different legal definitions for what exactly constitutes an electronic signature, generally an electronic signature is a digital mark (e.g., a set of characters or an image representative of a name) generated with some electronic means (e.g., with a computer or other electronic device) and that is attached to, or otherwise associated with an electronic or digital document, and intended to serve the same purpose as a hand-written signature.

Various electronic signature services have made the process of obtaining an electronic signature far more efficient than the time consuming task of obtaining a hand-written signature. Unfortunately, many conventional electronic signature services require many steps to be performed between a signature requestor and a signer, often making obtaining an electronic signature a burdensome and mistake-prone task.

DESCRIPTION OF THE DRAWINGS

Some embodiments of the technology are illustrated by way of example and not limitation in the figures of the accompanying drawings.

DETAILED DESCRIPTION

Overview

The present disclosure describes methods, systems, and computer program products, which individually provide functionality for facilitating electronic signatures based on physical proximity of devices, consistent with some embodiments of the technology.

In some example embodiments, the technology determines that a sender device (e.g., a device associated with a user providing a document to be electronically signed) is physically proximate to a signer device (e.g., a device associated with a would be signer of the document), and enables the document to be transmitted from the sender device to the signer device based on the physical proximity.

In determining two devices are physically proximate to one another, the devices may perform a handshake or other technique that confirms the devices are at the same physical location. Thus, the technology, in some example embodiments, facilitates a document author or signature requestor to obtain an electronic signature from a document signer without requiring the document author to input certain address or other identifying information associated with the document signer, among other benefits.

In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Suitable System

Figure 1:
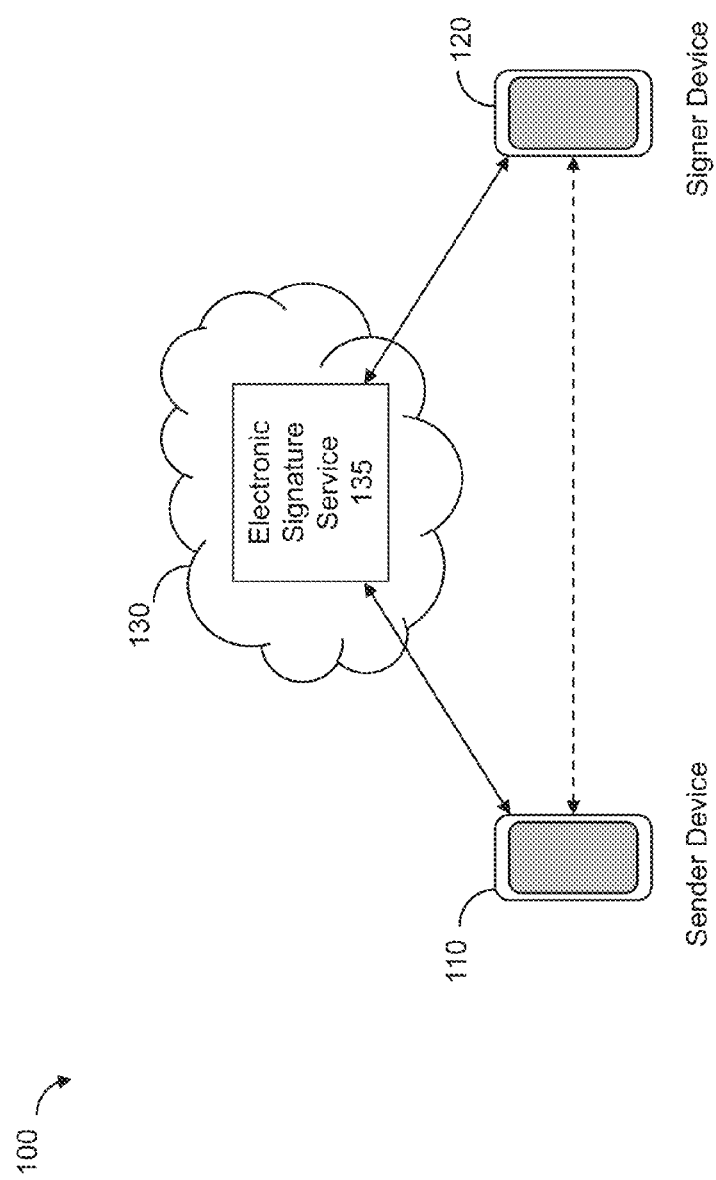
FIG. 1 is a block diagram illustrating an example of a network environment including a server operating an electronic signature service capable of facilitating electronic signatures based on physical proximity of devices, consistent with some embodiments of the technology.

FIG. 1 is a block diagram illustrating an example of a network environment including a server operating an electronic signature service capable of facilitating electronic signatures based on physical proximity of devices, consistent with some embodiments of the technology.

As shown in FIG. 1, a signature requester operates a sender computing device (e.g., a mobile phone, tablet computer, laptop, and so on) 110 to access over a network 130, with a web browser application, mobile app, or other document rendering application, an electronic signature service 135 located an executing at the server. Using the browser application, mobile app and/or other components supported by the sender device 110, the signature requester may determine a signer or recipient computing device 120 is physically proximate to the sender device 110, and upload one or more documents to the electronic signature service 135, to be signed by a document signer operating the signer device 120. Once the document is uploaded, the electronic signature service 135 may provide to the signer device a link or an address (e.g., Uniform Resource Locator (URL)) associated with a web page hosted by the electronic signature service 135 at which an instance of the document may be accessed, or may provide the document to the signer device 120 in order to obtain an electronic signature.

For purposes of the present disclosure, the terms "document author", "document originator" and "signature requester" are used synonymously to refer to a person who is utilizing an electronic signature service 135 to request that one or more persons electronically sign an instance of a document package. As such, the document author or document originator may or may not be the actual author of a particular written work product. Additionally, the term "document package" is used herein to refer to the document that is generated by the electronic signature service 135. For example, from the perspective of the electronic signature service 135, a document package may in fact be comprised of several original documents or source documents, with each original or source document being a file that has been uploaded to a server providing the electronic signature service. Accordingly, the electronic signature service 135 takes as input one or more original or source documents (e.g., individual source files) that are uploaded to the server providing the electronic signature service, performs various operations on the input files, and then manages the one or more files as a single instance of a document, referred to herein as an instance of a document package, for purposes of any signature operations that are to be performed with the one or more uploaded files. As such, the term "document package" is used to refer to a document (or group of documents) that have been uploaded to the server of the electronic signature service 135, and managed as a single instance of a document by the electronic signature service 135. Therefore, from the perspective of the electronic signature service 135, an instance of a document package may in fact be several input files (e.g., source documents), along with any metadata that is generated and associated with any one of the input files that makes up the document package.

Therefore, in some example embodiments, the technology enables a sender device 110 to determine a signer device 120 is physically proximate to the sender device 110 before providing the signer device 120 with access to a document package to be electronically signed.

The electronic signature service 135, the sender device 110, and the signer device 120 include a variety of functional modules. One skilled in the art will appreciate that, the functional modules are implemented with, a combination of software (e.g., executable instructions, or computer code) and hardware (e.g., at least a memory and processor). Accordingly, as used herein, with some embodiments a module is a processor-implemented module and represents a computing device having a processor that is at least temporarily configured and/or programmed by executable instructions stored in memory to perform one or more of the particular functions that are described herein.

Figure 2:
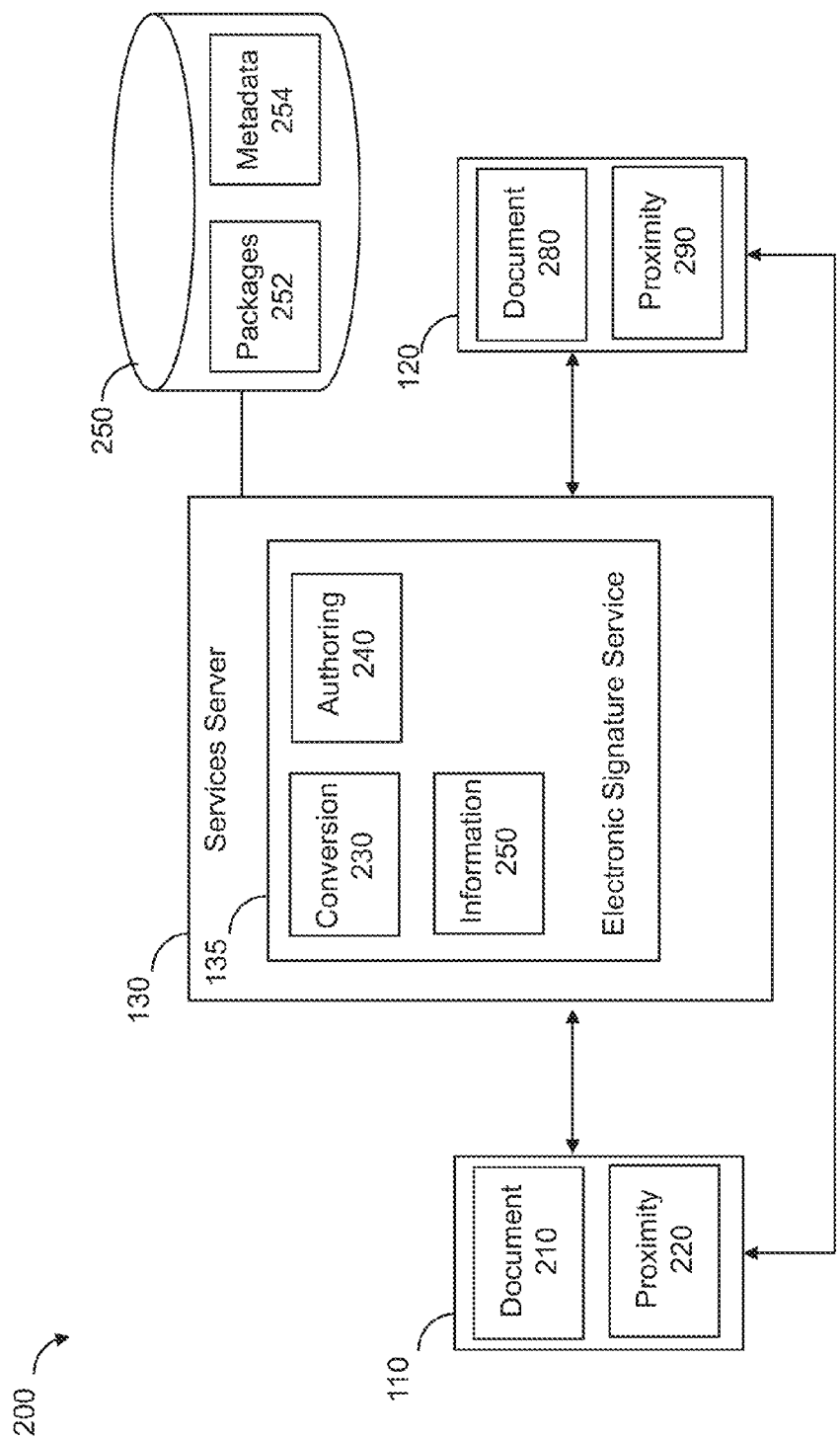
FIG. 2 is a block diagram illustrating example components of an electronic signature service facilitating electronic signatures based on physical proximity of devices, consistent with some embodiments of the technology.

FIG. 2 is a block diagram illustrating example components of an electronic signature service facilitating electronic signatures based on physical proximity of devices, consistent with some embodiments of the technology.

In some example embodiments, the sender device 110 includes a document module 210 configured and/or programmed to access the electronic signature service 135 in order to transfer documents, utilize interactive workflow services, receive documents (or, links to documents) to be electronically signed, or otherwise access and utilize services provided by the electronic signature service 135. The sender device 110 may also include a proximity module 220 configured and/or programmed to determine whether one or more other devices, such as a signer device 120, is physically proximate to the sender device 110. The proximity module 220 may utilize various techniques or components when making the determination that two devices are physically proximate, including:

Performing an electronic handshake between devices using Bluetooth, near-field communication (NFC) protocols, RFID, Wi-Fi, or other direct communication channels and/or protocols;

Performing an electronic handshake between devices using geo-location data, such as GPS data, associated with the devices;

Obtaining a visual confirmation that a device is proximate to another device, such as by obtaining a photo of a device, obtaining information displayed by the device, capturing a marker or indicator on the device, physically capturing visual information from the signer device using a camera of the sender device, and so on; and so on.

The proximity module 220 may utilize some or all of the techniques described herein, alone or in combination, when attempting to determine the location of one device with respect to another device.

In some example embodiments, the signer device 120, which may, in some example embodiments, act as a sender device, includes components similar to those of the sender device 110, including a document module 280 and a proximity module 290. Thus, in some example embodiments, the sender device 110 may be associated with a document signer and include components that facilitate obtaining an electronic signature from the signer, and the signer device 120 may be associated with a signature requestor and include components that facilitate determining the proximity of the sender device to the signer device and providing a document to be signed.

In some example embodiments, the electronic signature service 135 includes a conversion module 230. In general, the conversion module 230 will receive one or more original input documents (e.g., files), over a network. For example, the signature requester may upload the one or more input files to the electronic signature service 135. Once received, the conversion module 230 is triggered to perform a conversion operation on the one or more input files. In particular the conversion module 230 will process the individual input files to generate a single document package in a portable document format, such as a PDF file. Of course, other document or file formats may be used. In addition, the conversion module 230 may generate metadata that is stored in the database in association with the document package. For example, as illustrated in FIG. 2, database 250 stores document packages 252 (e.g., processed input files), and associated metadata 254.

The electronic signature service 135 additionally includes an authoring module 240. The authoring module 240 operates in conjunction with a user interface module (e.g., a web server module, not shown), to enable the signature requester to provide a variety of information (e.g., configuration parameters or settings) used with the signature request. For example, with some embodiments, the authoring module 240 provides a graphical user interface with which the signature requester can specify the location (e.g., page and position on page) of signature fields, date fields, or fields where a person is to provide his or her initials, and any other similar type of field that may be used to receive input data. This may be achieved, for example, by simply dragging and dropping various user interface elements, and then manipulating the size and position of those elements.

In addition to allowing the signature requester to add, delete, or otherwise edit fields within the document package, the authoring module 240 facilitates the establishment of document visibility setting for each person who has been specified to receive and/or sign a copy of document package. For example, using a graphical user interface associated with the authoring module 240, the document author or signature requester may specify that certain document recipients are to have visibility or access rights that allow that person to view only some portions (e.g., source documents, document sections, or pages) of the document package. With some embodiments, document visibility rights can be established for each person who is to receive and/or sign the document, and can be specified on a per-page, per-document section, or per-source document basis. Additionally, with some embodiments, document visibility rights may be defined for each person based on membership in a group. For example, with some embodiments, the electronic signature service 135 will allow users to generate accounts, and then add persons (as users) to the account. Accordingly, a signature requester may specify that certain portions of a document package are to be visible to only those persons who are members of, or otherwise associated with, a particular account, group or sub-group. Similarly, with some embodiments, visibility rights may be defined based on membership with a domain, such that various portions of a document may be visible or not visible to persons based on the domain name portion of their email address, or other messaging address.

In some example embodiments, the electronic signature service 135 includes an information module 250 configured and/or programmed to capture and/or store information associated with performed signature services, such as information identifying uploaded signature requests, received signatures, and so on. The information module 250 may utilize such information generate reports associated with the electronic signature service 135. The reports may include information identifying a time in which a document was uploaded and/or signed, information identifying the devices that uploaded and/or received the electronic signature, as well as information identifying a physical proximity determination between devices. The information module 250 may provide such information along with signed documents, among other things.

Obtaining Electronic Signatures from Physically Proximate Signers

Figure 3:
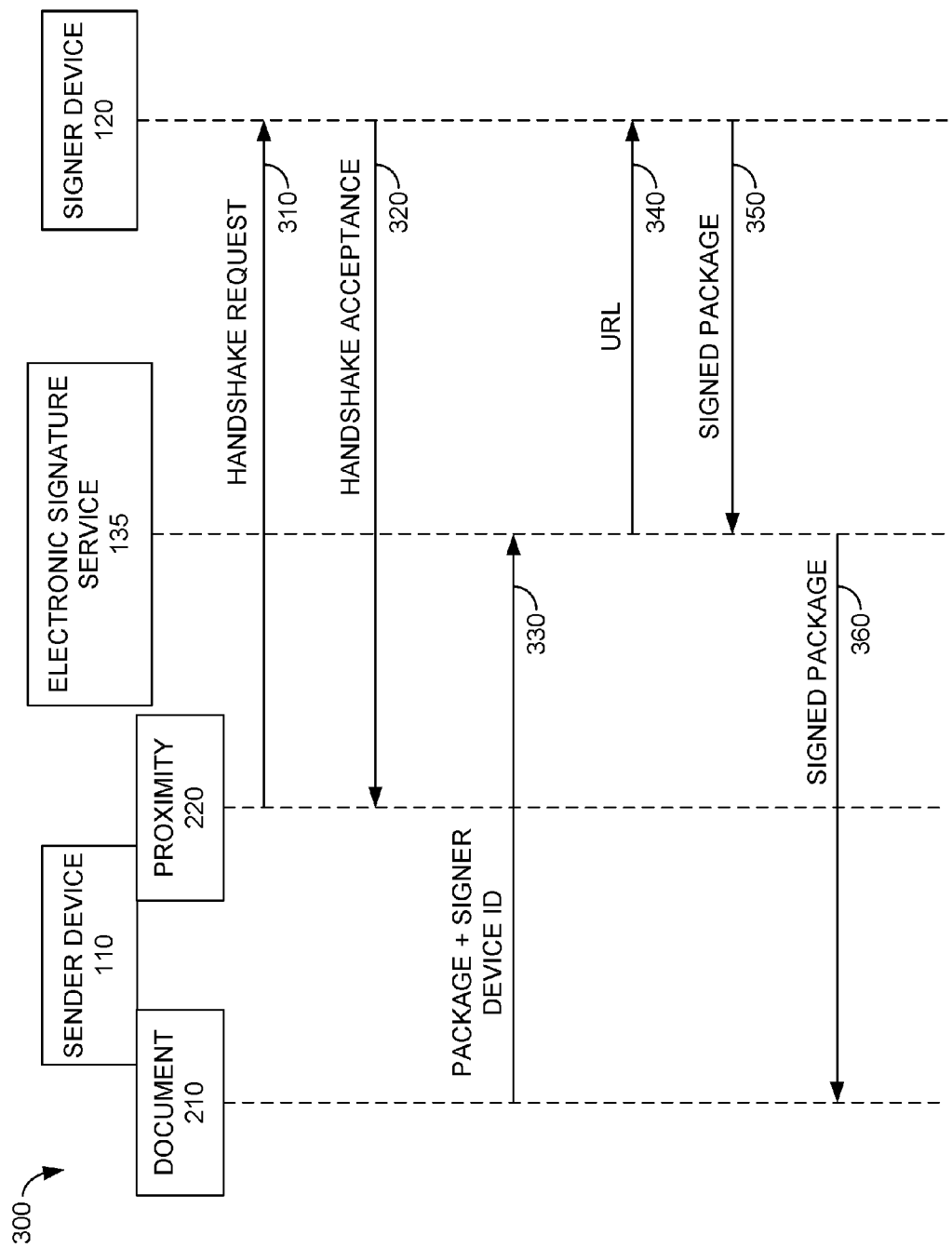
FIG. 3 is a schematic diagram illustrating example data flows between a sender device and a signer device, consistent with some embodiments of the technology.

As described herein, in some example embodiments, the technology enables a signature requestor to transfer a document to be signed to a document signer in response to a determination that a device of the document signer is proximate to a device of the signature requestor. FIG. 3 is a schematic diagram illustrating example data flows 300 between a sender device and a signer device, consistent with some embodiments of the technology.

Upon receiving an indication from a signature requestor to obtain an electronic signature for a document from a document signer located near the signature requestor, the sender device 110 associated with the signature requestor, via the proximity module 220, attempts to perform a handshake with a signer device 120 associated with the document signer by transmitting a handshake request 310 or other message to the signer device 120 via a direct communications channel.

The signer device 120 receives the handshake request 310, and transmits to the signer device 120 information 320 identifying the request has been received and/or accepted. In response to the acceptance, the sender device 110, via the document module 210, transfers information 330 including the document and information identifying the signer device 120 to the electronic signature service 135. The electronic signature service 135 receives the information 330, and transmits a URL 340 or other link or address associated with the document to be signed to the signer device 120. The signer device 120 accesses 350 the URL to sign the document. Once signed, the electronic signature service 135 transfers the signed document 360 to the sender device 110 and the signature requestor.

One of ordinary skill in the art will realize that the technology may utilize different data flows when determining the proximity of devices and/or sending documents or access to documents between devices. For example, the sender device 110, upon receiving confirmation of a handshake with the signer device 120, may transfer a document to be signed, or a link to a document to be signed, over the direct communications channel that established the handshake between the devices. Thus, in some example embodiments, a sender device 110 may utilize various different communication protocols when communicating and/or transferring information with a signer device 120. Further, a sender device 110 may bypass the electronic signature service 135 during some or all aspects of obtaining an electronic signature from a document signer at a signer device 120.

Figure 4:
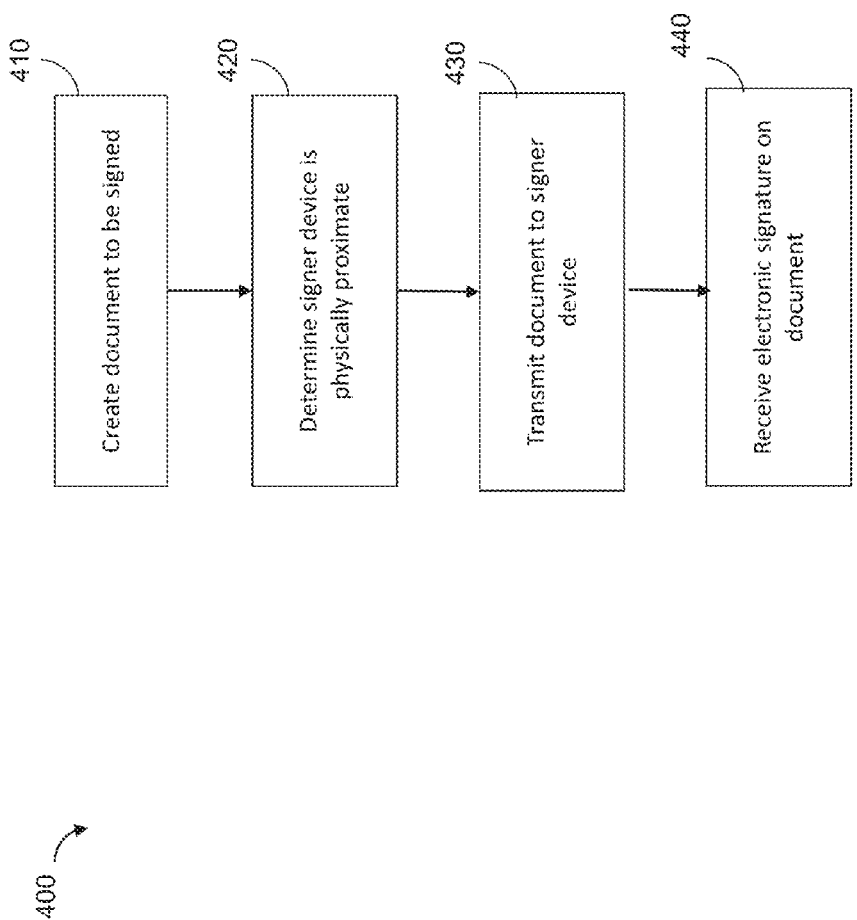
FIG. 4 is a flow diagram illustrating an example method for obtaining an electronic signature, consistent with some embodiments of the technology.

FIG. 4 is a flow diagram illustrating an example method 400 for obtaining an electronic signature, consistent with some embodiments of the technology. In step 410, a signature requestor creates a document to be signed. For example, a document management application running on a sender device 110 associated with a signature requestor creates a document in PDF format, In step 420, the technology determines that a signer device is physically proximate to the sender device. For example, the sender device 110, via the proximity component 220, affects a handshake with a signer device 120 in the proximity of the sender device 120.

As described herein, the sender device 110 may utilize various techniques for handshaking with another device, including establishing direct communication channels (e.g., Bluetooth, RFID, NFC, Wi-Fi, and so on) with a device, obtaining photos or other visual information from a device, using GPS or other geo-locational data to determine a device is within the same location, and so on.

In step 430, the technology transmits the document, or a link to the document, to be signed. For example, an electronic signature service 135, upon receiving an indication of a completed handshake between devices, transmits a URL through which a signer device 120 may access the document.

In step 440, the technology receives an electronic signature 440. For example, upon accessing the URL provided by the electronic signature service 135, the signer device, via a document module 280, enables a document signer to provide his or her electronic signature.

In some example embodiments, the electronic signature service 135 may receive other information from the signer device 120, such as custom fields, additional data, verifications, and so on.

In some example embodiments, the electronic signature service 135 may, via the information module 250, create and/or prepare reports associated with documents that are electronically signed. The reports may include information capturing the various data flows associated with obtaining an electronic signature, including information associated with a physical proximity determination. For example, a report associated with a document "Contract-Red House" may include the following:

Mar. 11, 2012—document created by Owner
Mar. 13, 2012—document signed by Renter, while in presence of Owner
Mar. 13, 2012—signed document emailed to all parties.

A report may include information identifying the proximity determination, providing support that a document was properly and/or timely executed, among other things. Of course, other information may be included in the reports.

Thus, in some example embodiments, the technology described herein enables a signature requestor to push a document to be signed to a signer device of a document signer in response to a determination that the signer device is proximate to the sender device of the signature requestor. Such a determination may optimize the process of obtaining electronic signatures, as signature requestor may not be required to fill in signer identity information. Also, using the proximity determination, the technology ensures that documents to be signed are accessed by the intended parties, among other benefits.

CONCLUSION

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 5:
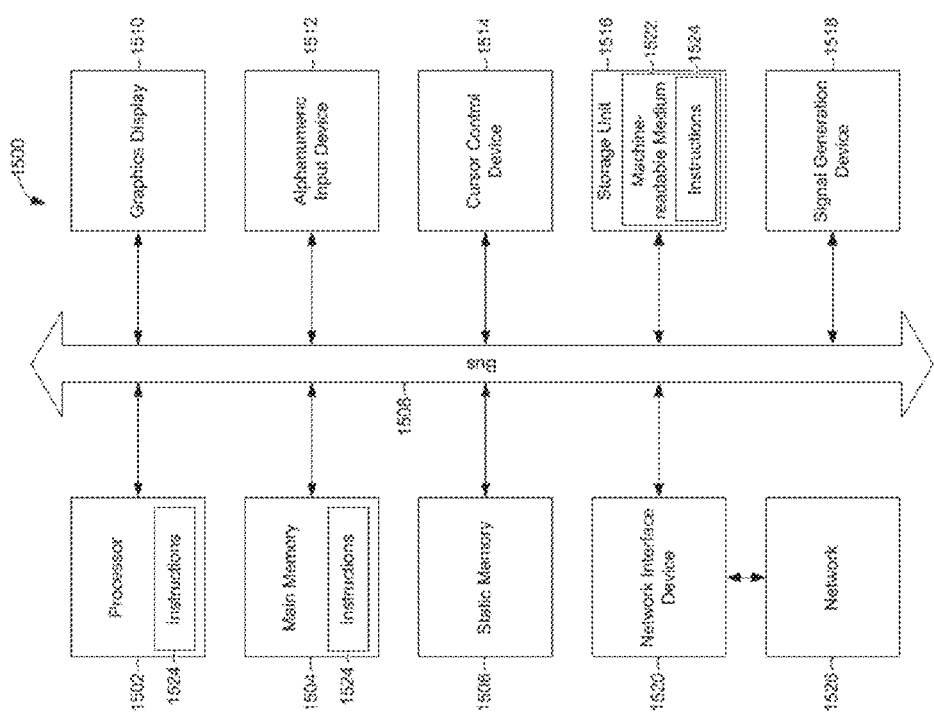
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computerized method for obtaining an electronic signature for a document, the method comprising:
    determining that a signer device is physically proximate to a sender device by sending an electronic handshake request directly to the signer device via a wireless, direct-communication channel between the sender device and the signer device, wherein the direct-communication channel is established when the signer device and the sender device are physically proximate to each other, and wherein the signer device is not physically connected to the sender device;

upon determining that the signer device is physically proximate to the sender device by receiving an electronic handshake acceptance via the direct-communication channel, transmitting an information package to one or more servers hosting an electronic signature service, the information package including a document to be signed and a device identifier that identifies the signer device and that is used by the one or more servers to transmit the document to the signer device, wherein the one or more servers transmit the document to the signer device by transmitting at least a URL to the signer device, and wherein the document is transmitted to the one or more servers by way of a communications channel other than the direct-communication channel used to exchange the electronic handshake request and the electronic handshake acceptance;

receiving a signed document from the signer device, the signed document being received by the one or more servers hosting the electronic-signature service; and transmitting signature-confirmation information from the one or more servers hosting the electronic-signature service to the sender device, the signature-confirmation information indicating that the signed document was received.

2. The computerized method of claim 1 further comprising, receiving information identifying the signer device; and transmitting the document from the electronic signature service to the signer device based at least in part on the received information identifying the signer device.

3. The computerized method of claim 1, wherein the signature-confirmation information includes the signed document.

4. The computerized method of claim 1, wherein the signature-confirmation information includes information identifying a time at which the signed document was uploaded, signed, or a combination thereof.

5. The computerized method of claim 4, wherein the information identifying the time is transmitted from the server together with the signed document.

6. A system for obtaining an electronic signature from a user at a document-signing device, the system comprising:

a document logic with a hardware processor, wherein the document logic is configured to generate a document package for a document to be signed using the document-signing device;

an authoring logic with a hardware processor configured to generate a digital-signature field added to the document;

a proximity logic with a hardware processor, wherein the proximity logic is configured to determine that the document-signing device is proximate to a signature-requesting device, and wherein the document package is transmitted with an identifier of the document-signing device to an electronic signature service when proximity of the document-signing device to the signature-requesting device is confirmed; and the electronic signature service that transmits at least a URL to the document-signing device, the URL for accessing the document to be signed by the document-signing device.

7. The system of claim 6, wherein the proximity logic is configured to perform a handshake between a signature-requesting device and the document-signing device.

8. The system of claim 6, wherein the proximity logic is configured to perform a handshake between a signature-requesting device and the document-signing device by establishing a direct communication channel between the sender device and the signer device.

9. The system of claim 6, wherein the proximity logic is configured to perform a handshake between a signature-requesting device and the document-signing device by establishing a Bluetooth communication channel between the sender device and the signer device.

10. The system of claim 6, wherein the proximity logic is configured to perform a handshake between a signature-requesting device and the document-signing device by establishing a near field communication channel between the sender device and the signer device.

11. The system of claim 6, wherein the proximity logic is configured to perform a handshake between a signature-requesting device and the document-signing device by establishing a radio frequency identification RFID) channel between the sender device and the signer device.

12. The system of claim 6, wherein the proximity logic is configured to determine that the document-signing device is proximate to a signature-requesting device by capturing visual information from the document-signing device.

13. The system of claim 6, wherein the proximity logic is configured to determine that the document-signing device is proximate to a signature-requesting device by obtaining geo-location data associated with the signer device.

14. The system of claim 6, wherein the proximity logic and the document logic are contained by the document-signing device.

15. The system of claim 6, wherein the information logic is configured to store a record identifying a document-signing event occurring combined with the determination by the proximity logic that the document-signing device is proximate to the signature-requesting device.

16. A computer-readable storage hardware device whose contents, when executed by a processor of a computing system, cause the computing system to perform a method for obtaining an electronic signature for a document, the method comprising:

storing, by a signature-requesting device, a document that is to receive a digital signature in a signature field;

determining that a signature-providing device is physically proximate to the signature-requesting device by sending a handshake request directly to the signature-providing device via a direct-communication channel established directly between the signature-requesting device and the signature-providing device, wherein the signature-providing device is not physically connected to the signature-requesting device;

receiving, by the signature-requesting device, a handshake acceptance from the signature-providing device, the handshake acceptance being received by way of the direct-communication channel; and upon determining that the signature-providing device is physically proximate to the signature-requesting device, transmitting, by the signature-requesting device, an information package to one or more servers hosting an electronic signature service, the information package including the document and a device identifier that identifies the signature-providing device and that is used by the one or more servers to transmit the document to the signature-providing device, wherein the one or more servers transmit the document to the signature-providing device by transmitting at least a URL to the signature-providing device, and wherein the document is transmitted to the one or more servers by way of a communication channel other than the direct-communication channel used to exchange the handshake request and the handshake acceptance.

17. The computer-readable storage hardware device of claim 16, wherein the handshake request and the handshake acceptance are exchanged using near field communication protocol.

18. The computer-readable storage hardware device of claim 16, wherein the handshake request and the handshake acceptance are exchanged using Bluetooth.

19. The computer-readable storage hardware device of claim 16 further comprising, receiving from the one or more servers signature-confirmation information by way of the communication channel other than the direct-communication channel used to exchange the handshake request and the handshake acceptance.

* * * * *